(12) United States Patent
Kuo et al.

(10) Patent No.: US 10,884,856 B2
(45) Date of Patent: Jan. 5, 2021

(54) ERROR-HANDLING METHOD, ASSOCIATED DATA STORAGE DEVICE AND CONTROLLER THEREOF

(71) Applicant: Silicon Motion Inc., Hsinchu County (TW)

(72) Inventors: Che-Ming Kuo, Hsinchu County (TW); Yen-Ting Yeh, Taoyuan (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/568,192

(22) Filed: Sep. 11, 2019

(65) Prior Publication Data

US 2020/0110662 A1    Apr. 9, 2020

Related U.S. Application Data

(60) Provisional application No. 62/740,439, filed on Oct. 3, 2018.

(30) Foreign Application Priority Data

May 16, 2019   (TW) .............................. 108116832 A (51) Int. Cl.
*G06F 11/10* (2006.01)
*G06F 13/16* (2006.01)

(52) U.S. Cl.
CPC ...... *G06F 11/1068* (2013.01); *G06F 13/1668* (2013.01)

(58) Field of Classification Search
CPC .................................................. G06F 11/1068

USPC ................................. 714/766, 768, 765, 770
See application file for complete search history.

(56) References Cited

U.S. PATENT DOCUMENTS

| | | | |
|---|---|---|---|
| 5,291,494 A | 3/1994 | Bruckert | |
| 5,625,840 A | 4/1997 | Numata | |
| 6,802,039 B1 | 10/2004 | Quach | |
| 6,804,794 B1 | 10/2004 | Robidoux | |
| 7,096,407 B2 | 8/2006 | Olarig | |

(Continued)

FOREIGN PATENT DOCUMENTS

| | | |
|---|---|---|
| JP | 2006-107045 A | 4/2006 |
| JP | 2009-230414 A | 10/2009 |

(Continued)

*Primary Examiner* — Fritz Alphonse
(74) *Attorney, Agent, or Firm* — Winston Hsu (57) ABSTRACT

An error-handling method, an associated data storage device and the controller thereof are provided. The error-handling method may include: uploading an error-handling program to a buffer memory equipped with error correction code (ECC) protection capability; in response to at least one error, interrupting execution of a current procedure and activating an interruption service; executing the error-handling program on the buffer memory; disabling a transmission interface circuit; resetting at least one hardware engine and at least one NV memory element; performing cache rearrangement regarding a data cache within the data storage device, and programming rearranged cache data into the NV memory element, to perform data recovery; and through activating a watchdog module and the transmission interface circuit and relinking with a host device, completing soft reset to make the data storage device operate normally again.

20 Claims, 5 Drawing Sheets

(56) References Cited

U.S. PATENT DOCUMENTS

| | | |
|---|---|---|
| 7,417,600 B2 | 8/2008 | Smith |
| 8,959,420 B1 * | 2/2015 | Piszczek ............. G06F 11/1096 |
| | | 714/801 |
| 9,690,642 B2 | 6/2017 | Anderson |
| 2006/0075186 A1 | 4/2006 | Abe |
| 2010/0005366 A1 | 1/2010 | Dell |
| 2016/0110124 A1 * | 4/2016 | Camp ................... G06F 11/076 |
| | | 714/704 |
| 2016/0110252 A1 * | 4/2016 | Hyun ................. G06F 11/1044 |
| | | 714/766 |
| 2016/0118132 A1 * | 4/2016 | Prins .................. G11C 16/3431 |
| | | 714/704 |
| 2016/0291883 A1 | 10/2016 | Manohar |
| 2017/0177276 A1 | 6/2017 | Delaney |
| 2017/0262202 A1 | 9/2017 | Seo |
| 2018/0025777 A1 * | 1/2018 | Jacobvitz ............... G11C 29/52 |
| | | 714/764 |
| 2018/0060232 A1 | 3/2018 | Oshinsky |

FOREIGN PATENT DOCUMENTS

| | | |
|---|---|---|
| JP | 2014182847 A | 9/2014 |
| JP | 2015-176153 A | 10/2015 |
| KR | 19990087932 A | 12/1999 |
| KR | 20030075356 A | 9/2003 |
| KR | 1020040047584 A | 6/2004 |
| TW | I516915 B | 1/2016 |
| TW | I537815 B | 6/2016 |
| TW | I537967 B | 6/2016 |

* cited by examiner

ERROR-HANDLING METHOD, ASSOCIATED DATA STORAGE DEVICE AND CONTROLLER THEREOF

CROSS REFERENCE TO RELATED APPLICATIONS

This application claims the benefit of U.S. Provisional Application No. 62/740,439, which was filed on Oct. 3, 2018, and is included herein by reference.

BACKGROUND OF THE INVENTION

1. Field of the Invention

The present invention relates to accessing flash memories, and more particularly, to an error-handling method, an associated data storage device and a controller thereof.

2. Description of the Prior Art

Developments in flash memory technology have led to the wide application of portable or non-portable data storage devices. Examples include memory cards conforming to SD/MMC, CF, MS, XD or UFS specifications, solid-state drives, and embedded storage devices conforming to UFS or EMMC specifications. NAND flash memories may comprise single level cell (SLC) and multiple level cell (MLC) flash memories. New data storage device products may utilize triple level cell (TLC) flash memories, or even quadruple level cell (QLC) flash memories. To ensure that access control of a flash memory in a data storage device meets related specifications, a controller of the flash memory is usually arranged to have some management mechanisms to properly manage internal operations thereof.

The data storage device with these management mechanisms has some disadvantages, however. For example, with the element density in the semiconductor process becoming higher, the possibility of the occurrence of soft errors also becomes higher. When the soft errors occur, bit-flipping errors typically appear along with them. Some suggestions have been proposed in the related art to try preventing the situation from getting worse. No matter which solution within these solutions is adopted, when the amount of error bits exceeds a correctable range of a certain error correction mechanism, the conventional architecture typically controls the data storage device to enter a system halted state to prevent all kinds of unpredictable errors. However, such control of the conventional architecture definitely makes the entire data storage device unable to proceed the operation, and tremendously increases the risk of user data loss. Thus, there is a need for a novel method and associated architecture to implement a data storage device having a reliable management mechanism without introducing any side effect or in a way that is less likely to introduce side effects.

SUMMARY OF THE INVENTION

An objective of the present invention is to provide an error-handling method, an associated data storage device and a controller thereof, to solve the above problems.

Another objective of the present invention is to provide an error-handling method, an associated data storage device and a controller thereof, in order to make the data storage device have a reliable management mechanism without introducing any side effect or in a way that is less likely to introduce side effects.

At least one embodiment of the present invention provides an error-handling method. The error-handling method is applicable to a data storage device, the data storage device comprises a non-volatile (NV) memory and a memory controller arranged to control the access of the NV memory, the NV memory comprises at least one NV memory element, and the aforementioned at least one NV memory element comprises a plurality of blocks. The error-handling method comprises: uploading an error-handling program to a buffer memory equipped with error correction code (ECC) protection capability, wherein the buffer memory is positioned in the memory controller; in response to at least one error, interrupting execution of a current procedure and activating an interruption service; executing the error-handling program on the buffer memory; disabling a transmission interface circuit, wherein the transmission interface circuit is positioned in the memory controller, and is arranged to perform communications with a host device; resetting at least one hardware engine and the aforementioned at least one NV memory element; performing cache rearrangement regarding a data cache within the data storage device, and programming rearranged cache data into the at least one NV memory element, to perform data recovery; and through activating a watchdog module in the memory controller, and activating the transmission interface circuit and relinking with the host device, completing soft reset to make the data storage device operate normally again.

At least one embodiment of the present invention provides a data storage device. The data storage device comprises an NV memory and a controller. The NV memory is arranged to store information, wherein the NV memory comprises at least one NV memory element, and the aforementioned at least one NV memory element comprises a plurality of blocks. The controller is coupled to the NV memory, and arranged to control operations of the data storage device, wherein the controller comprises a buffer memory, a transmission interface circuit and a processing circuit. The buffer memory is arranged to temporarily store information. The transmission interface circuit conforms to a specific communications specification, wherein the transmission interface circuit performs communications according to the specific communications specification. The processing circuit is arranged to control the controller according to a plurality of host commands from a host device, to allow the host device to access the NV memory through the controller. For example, the controller may upload an error-handling program to the buffer memory equipped with ECC protection capability. In response to at least one error, the controller interrupts execution of a current procedure and activates an interruption service. The controller executes the error-handling program on the buffer memory. The controller disables the transmission interface circuit, wherein the transmission interface circuit is arranged to perform communications with the host device. The controller resets at least one hardware engine and the aforementioned at least one NV memory element. The controller performs cache rearrangement regarding a data cache within the data storage device, and programs rearranged cache data into the aforementioned at least one NV memory element, to perform data recovery. Through activating a watchdog module in the controller, activating the transmission interface circuit and relinking with the host device, the controller completes soft reset to make the data storage device operate normally again.

At least one embodiment of the present invention provides a controller of a data storage device. The data storage device comprises the controller and an NV memory. The NV memory comprises at least one NV memory element, and the aforementioned at least one NV memory element comprises a plurality of blocks. The controller comprises a buffer memory, a transmission interface circuit and a processing circuit. The buffer memory is arranged to temporarily store information. The transmission interface circuit conforms to a specific communications specification, wherein the transmission interface circuit performs communications according to the specific communications specification. The processing circuit is arranged to control the controller according to a plurality of host commands from a host device, to allow the host device to access the NV memory through the controller. For example, the controller uploads an error-handling program to the buffer memory equipped with ECC protection capability. In response to at least one error, the controller interrupts execution of a current procedure and activates an interruption service. The controller executes the error-handling program on the buffer memory. The controller disables the transmission interface circuit, wherein the transmission interface circuit is arranged to perform communications with the host device. The controller resets at least one hardware engine and the at least one NV memory element. The controller performs cache rearrangement regarding a data cache within the data storage device and programs rearranged cache data into the aforementioned at least one NV memory element, to perform data recovery. Through activating a watchdog module in the controller, activating the transmission interface circuit and relinking with the host device, the controller completes soft reset to make the data storage device operate normally again.

By the carefully designed management mechanism, the present invention can properly control operations of a controller, and more particularly, can make a data storage device able to perform self-recovery when one or more soft errors occur, for example, in a situation where the data storage device suffers from interference (e.g. radiation, noise, etc.) As the data storage device can perform the self-recovery when the one or more soft errors occur, the present invention can reduce a Soft Error Rate (SER), and can extremely reduce the risk of user data loss. In addition, implementation of embodiments of the present invention will not greatly increase additional costs. Thus, the problems of the related art can be solved without greatly increasing costs. In comparison with the related art, the present invention can achieve optimal performance of the data storage device without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
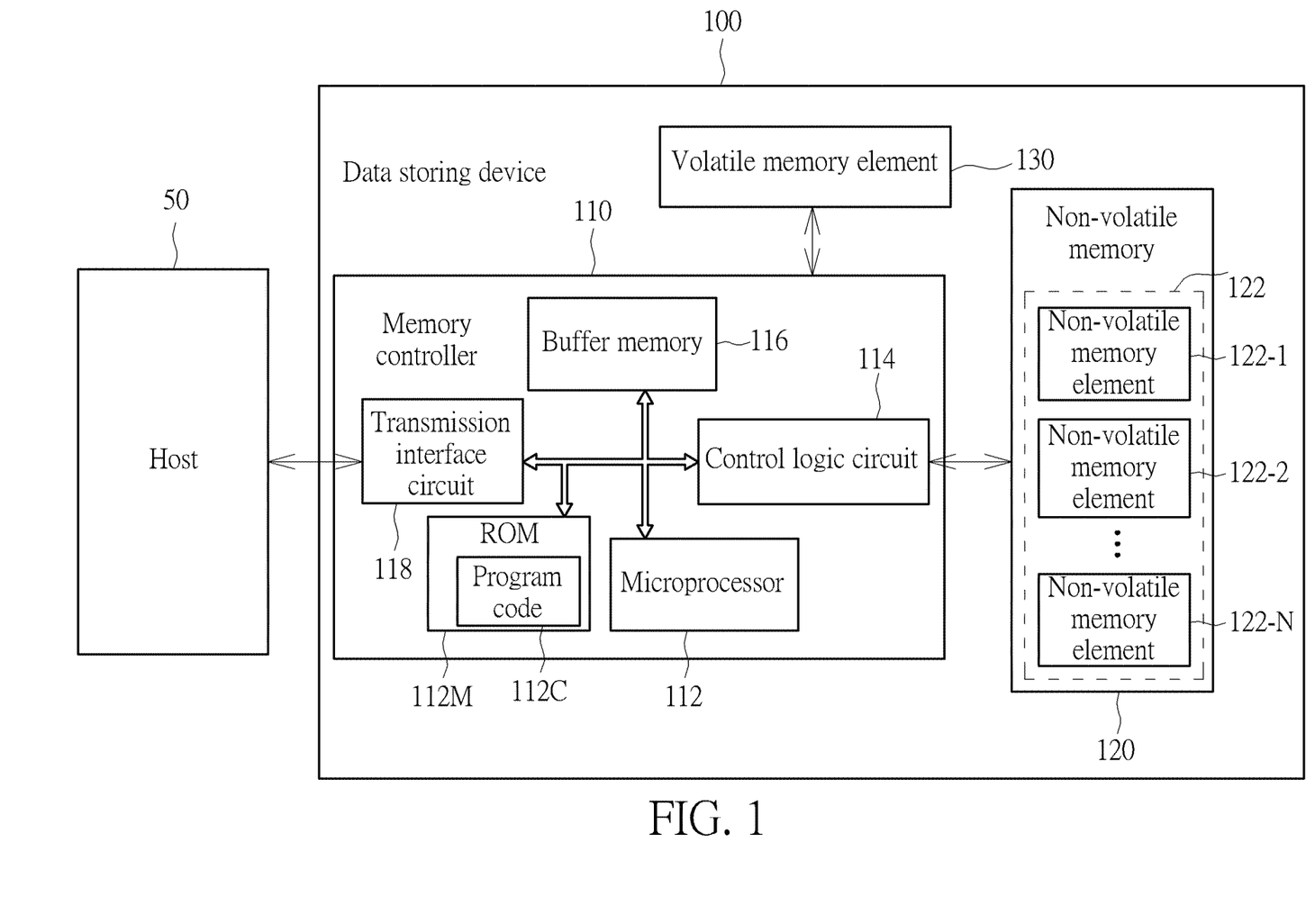
FIG. 1 is a diagram illustrating a data storage device and a host device according to an embodiment of the present invention.

FIG. 1 is a diagram illustrating a data storage device 100 and a host device 50 according to a first embodiment of the present invention. The data storage device 100 may be a solid-state drive (SSD). In addition, examples of the host device 50 may include, but are not limited to: a multifunctional mobile phone, a tablet and a personal computer such as a desktop computer and a laptop computer. According to this embodiment, the data storage device 100 may comprise a controller such as the memory controller 110, and may further comprise a non-volatile (NV) memory 120, where the controller is arranged to access the NV memory 120, and the NV memory 120 is arranged to store information.

The NV memory 120 may comprise a plurality of NV memory elements 122-1, 122-2, . . . and 122-N, where "N" may represent a positive integer greater than one. For example, the NV memory 120 may be a flash memory, and the NV memory elements 122-1, 122-2, . . . and 122-N may be a plurality of flash memory chips (which may be referred to as flash chips for brevity) or a plurality of flash memory dies (which may be referred to as flash dies for brevity), but the present invention is not limited thereto. In addition, the data storage device 100 may further comprise a volatile memory element 130 for buffering data, where the volatile memory element 130 is preferably a dynamic random access memory (DRAM). Under control of the memory controller 110, the data storage device 100 may utilize at least one portion (e.g. a portion or all) of the storage space of the volatile memory element 130 to be a data buffer region for temporarily storing data, e.g. during accessing the NV memory 120. In addition, the volatile memory element 130 is an optional element.

The memory controller 110 may comprise a processing circuit such as a microprocessor 112, a storage device such as a read only memory (ROM) 112M, a control logic circuit 114, a buffer memory 116 and a transmission interface circuit 118, where these elements may be coupled to each other via a bus. The buffer memory is preferably a static random access memory (SRAM). For example, the memory controller 110 may utilize the buffer memory 116 such as the SRAM to be a first layer of cache, and utilize the volatile memory element 130 such as the DRAM to be a second layer of cache. The storage capacity of the DRAM is preferably greater than that of the buffer memory 116, and data buffered by the buffer memory 116 may be from the DRAM or the NV memory 120.

The ROM 112M of this embodiment is arranged to store a program code 112C, and the microprocessor 112 is arranged to execute the program code 112C to control access to the NV memory 120. Note that the program code 112C may be stored in the buffer memory 116 or any type of memory. In addition, the control logic circuit 114 may comprise at least one error correction code (ECC) circuit (not shown) to protect data and/or perform error correction. The transmission interface circuit 118 may conform to a specific communications specification (such as the Serial Advanced Technology Attachment (SATA) specification, the Peripheral Component Interconnect Express (PCIE) specification or the Non-Volatile Memory Express (NVME) specification), and may perform communications according to the specific communications specification, and more particularly, may perform communication with the host device 50 according to the specific communications specification.

In this embodiment, the host device 50 may transmit a plurality of host commands to the data storage device 100, and the memory controller 110 accesses the NV memory 120 (e.g. reads or writes data in the NV memory 120) according to the host commands, where the aforementioned data is preferably user data from the host device 50. The host commands comprise logical addresses, e.g. logical block addresses (LBAs). The memory controller 110 may receive the host commands and respectively translate the host commands into memory operation commands (referred to as operation commands for brevity), and further control the NV memory 120 with the operation commands to read, write/program pages of specific physical addresses within the NV memory 120. The memory controller 110 records mapping relationships between logical addresses and physical addresses of data in a logical-to-physical address mapping table (referred to as L2P mapping table), where any of the physical addresses (e.g. each physical address) may be constituted by a channel number, a logical unit number (LUN), a plane number, a block number, a page number and an offset. In some embodiments, the implementation of the physical addresses may vary. For example, any of the physical addresses (e.g. each physical address) may comprise a channel number, an LUN, a plane number, a block number, a page number and/or an offset.

The L2P mapping table may be stored in a system block within the NV memory 120, and may be divided into a plurality of group mapping tables, where the system block is preferably an encrypted block and programmed in an SLC mode. The memory controller 110 may load partial or all group mapping tables within the plurality of group mapping tables into the buffer memory 116 from the NV memory 120 according to the capacity of the buffer memory 116 for quick reference, but the present invention is not limited thereto. When user data is updated, the memory controller 110 may update the group mapping tables according to a latest mapping relationship of the user data. A size of any group mapping table within the group mapping tables is preferably equal to a size of one page of a NV memory element 122-$n$, e.g. 16 KB (kilobytes), where "n" may represent any positive integer within an interval [1, N], but the present invention is not limited thereto. For example, the size of the aforementioned any group mapping table may be less than the size of one page, e.g. 4 KB or 1 KB. Of course, the size of the aforementioned any group mapping table may be equal to the size of a page of the NV memory elements 122, for example, in a situation where N=4, the total size of the respective one page (s) of the 4 NV memory elements 122 (e.g. the size of a combined page comprising a page of each of the 4 NV memory elements 122), such as 64 KB, wherein the page of the 4 NV memory elements 122 (such as that formed with these four pages of the 4 NV memory elements 122) may be referred to as super page.

Additionally, the minimum unit that the memory controller 110 performs programming operations upon the NV memory 120 may be a page, and the minimum unit that the memory controller performs erasing operations upon the NV memory 120 may be a block. Each block within the blocks of the NV memory element 122-$n$ comprises multiple pages.

In a write cache mode, the host device 50 may send a write command to request the memory controller 110 to write a set of user data (referred to as data for brevity) into the NV memory 120. The memory controller 110 may receive or download the set of data from the host device 50, utilize the buffer memory 116 to buffer this set of data, and utilize the volatile memory element 130 to cache this set of data, and then directly respond with a message of completion of execution of the write command to the host device 50. Afterwards, when a write condition is satisfied, e.g. an accumulated data length is equal to or greater than a page length or a super page length, the memory controller 110 may write the cached data into the NV memory 120.

Figure 2:
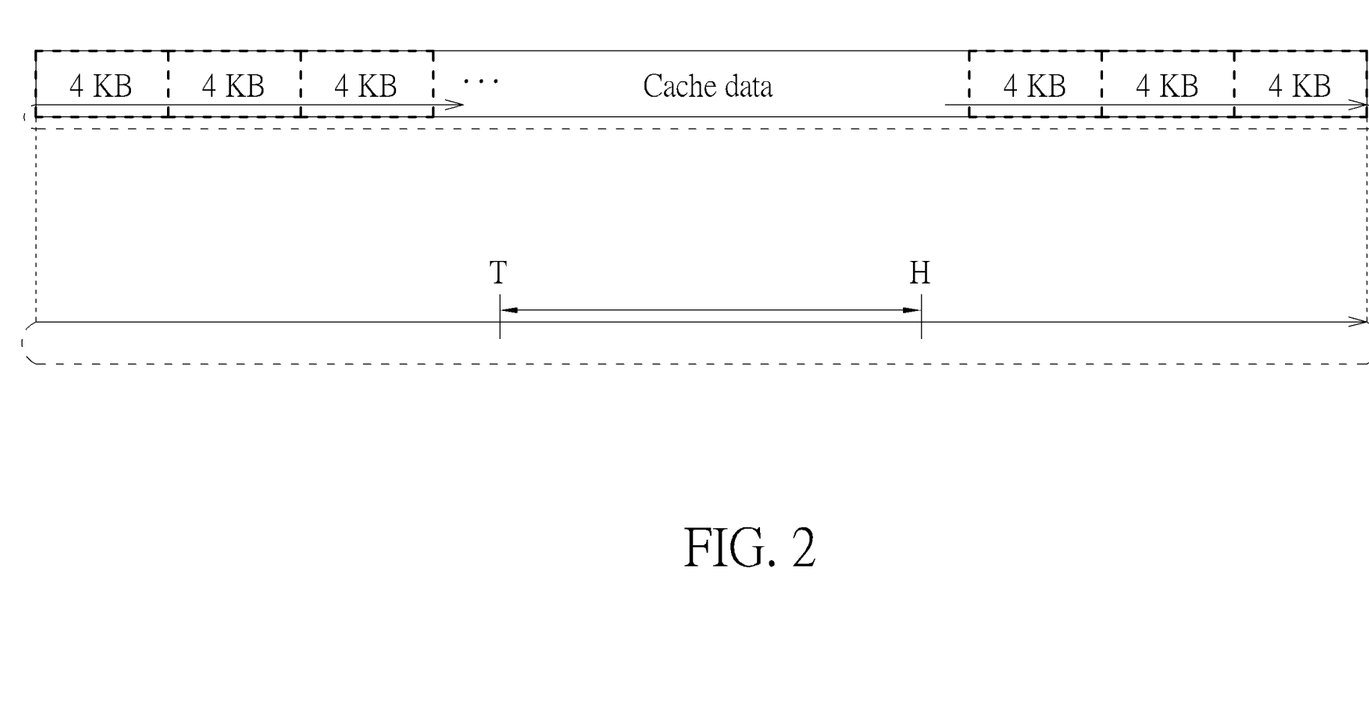
FIG. 2 illustrates a cache allocation scheme according to an embodiment of the present invention.

The microprocessor 112 of the memory controller 110 may perform cache allocation of a data cache, and in response to the allocation operation and/or other associated operations, the microprocessor 112 may update the addresses of the cache head H and the cache tail T of the data cache, as shown in FIG. 2, wherein the cache head H and the cache tail T may be regarded as the cache allocation parameters of data cache. The horizontal axis in the lower half of FIG. 2 represents a cache range. Taking the volatile memory element 130 as an example of the aforementioned data cache, the cache range corresponds to the range of the cache address, such as the cache address range. Regarding the cache address range, the memory controller 110 (e.g. the microprocessor 112 thereof) may allocate the cache space of the volatile memory element 130 with the unit of 4 KB. For example, the cache space of the volatile memory element 130 can be allocated according to a predetermined order (e.g., from left to right). Regarding any two address values in the cache address range, the address value in the left hand side is less than that in the right hand side, but the present invention is not limited thereto.

The microprocessor 112 uses the cache space of the volatile memory element 130 in a cyclic manner, and therefore, the cache address range may be regarded as a cyclic address range, and the cache range corresponding to the cache address range may be regarded as a cyclic range. When the microprocessor 112 caches data having a length of 4 KB, the microprocessor 112 may move (or shift) the address of the cache head H from left to right by a basic increment (e.g. 1), making the cache space as indicated by the new and the old locations of the cache head H (such as that between the new location after the move and the old location before the move) be capable of storing 4 KB cache data.

The microprocessor 112 may allocate a first-in-first-out (FIFO) buffer for a set of 4 KB data for the volatile memory element 130. As a result, the set of 4 KB data will be written into the NV memory 120. When the allocation of the FIFO buffer is completed, the microprocessor 112 may move (or shift) the cache tail T from left to right by the basic increment (e.g. 1), to update the cache tail T to correspond to the next set of 4 KB data that is to be written into the NV memory 120. To simplify, the range between the cache head H and the cache tail T can be realized as cached data (which may be referred to as cache data for brevity), and the remaining cache space is either blank or storing invalid data, where the microprocessor 112 may write data into the blank cache space.

According to some embodiments, the aforementioned at least one ECC circuit may comprise a plurality of ECC circuits such as a plurality of ECC engines. The plurality of ECC circuits may generate parity codes of data in response to a plurality of procedures respectively, and/or may perform error correction on data according to the parity codes. More particularly, the plurality of ECC circuits may operate in parallel, and thus the memory controller 110 (e.g. the microprocessor 112) may assign the plurality of procedures to the plurality of ECC circuits, but the present invention is not limited thereto.

In some embodiments, the buffer memory 116 may store important information. Examples of the important information may include, but are not limited to: user data originated from the host device 50, instructions and data of one or more specific program codes, and so on.

Figure 3:
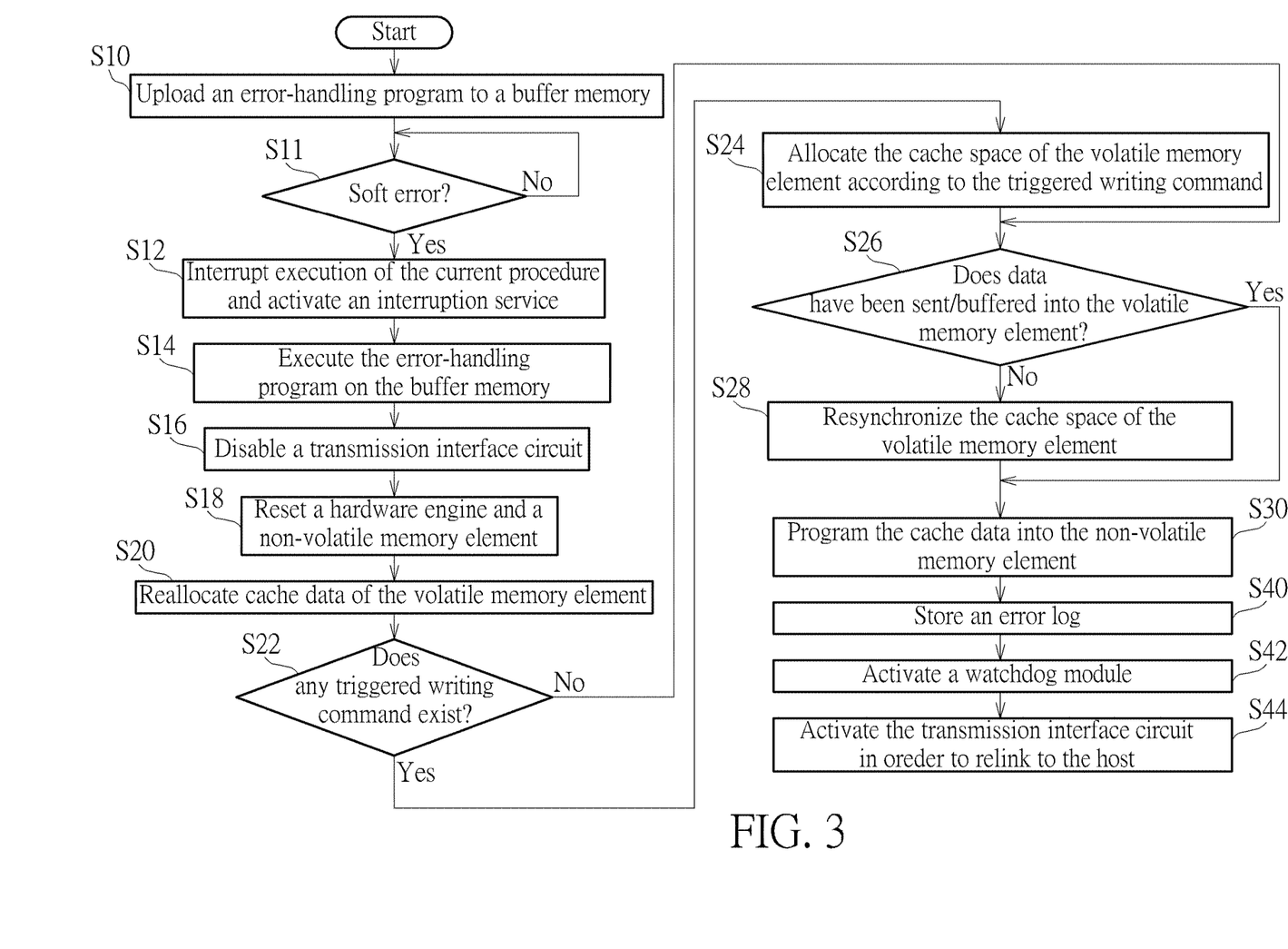
FIG. 3 illustrates a flowchart of an error-handling method according to an embodiment of the present invention.

FIG. 3 illustrates a flowchart of an error-handling method according to an embodiment of the present invention. The error-handling method may be applied to data storage device 100 and be executed by the memory controller 110 of the data storage device 100, and may perform error-handling regarding soft errors generated during the operations of the data storage device 100. The error-handling method of the present invention may make the data storage device 100 capable of fixing errors, and may execute soft reset to instantly restore the data storage device 100 back to the normal mode to make it continue working.

In the following, the present invention error-handling method may be divided into three groups of steps, wherein Steps S10-S18 combined may be collectively referred to as an initial step of the present invention error-handling method, Steps S20-S30 may be collectively referred to as a data recovery step of the error-handling method of the present invention, and Steps S40-S44 may be collectively referred to as a system recovery step of the error-handling method of the present invention. Each of the above steps may be described as follows.

In Step S10, the memory controller 110 uploads an error-handling program to the buffer memory 116, wherein the buffer memory 116 is preferably equipped with the ECC protection capability, and more particularly, the capability of performing error correction according to parity code(s). For example, the buffer memory 116 may generate the parity code(s) by itself to protect the error-handling program. In another example, the ECC circuit may generate the parity code(s) for the error-handling program, and the memory controller 110 may upload the error-handling program and the parity code(s) altogether to the buffer memory 116. Since the buffer memory 116 is equipped with the ECC protection capability, the error-handling program can be effectively protected.

In Step S11, the memory controller 110 determines whether one or more soft errors are generated. If Yes, Step S12 is executed; if No, Step S11 is executed repeatedly. The soft errors may comprise errors that are generated by hardware elements or by execution of firmware, and after the soft errors are generated, the errors will be handled with the error-handling program, rather than the conventional system-reboot method. Preferably, the memory controller 110 may utilize a built-in error detection circuit to determine whether the one or more soft errors are generated. For better comprehension, assume that the memory controller 110 may comprise multiple cores, and one core within the cores may be used to determine whether the one or more soft errors are generated.

Figure 4:
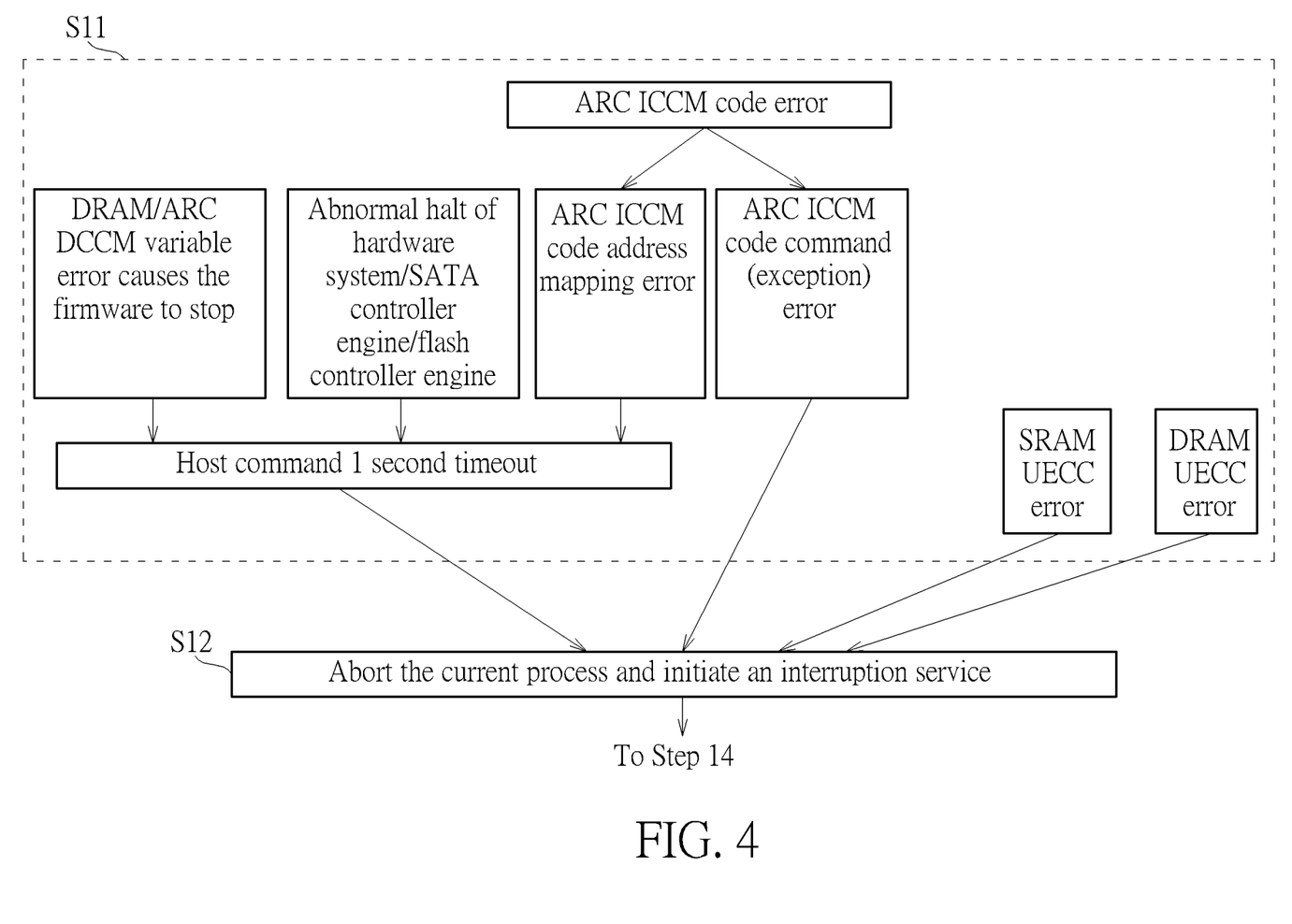
FIG. 4 illustrates implementation details regarding how the memory controller shown in FIG. 1 determines whether one or more soft errors are generated according to an embodiment of the present invention.

FIG. 4 illustrates implementation details regarding how the memory controller 110 shown in FIG. 1 determines whether the one or more soft errors are generated according to an embodiment of the present invention. For example, the hardware architecture of the microprocessor 112 may be implemented with the Reduced Instruction Set Computing (RISC) architecture such as the Argonaut RISC Core (ARC) architecture, and may be embedded with the Instruction Close Coupled Memory (ICCM) and the Data Close Coupled Memory (DCCM), but the present invention is not limited thereto. The microprocessor 112 may control operations of a SATA-PHY circuit by using a SATA controller (e.g. a SATA controller engine), and may control associated circuits within the control logic circuit 114 (e.g. an input/output (I/O) interface circuit for interfacing the NV memory 120, the aforementioned at least one ECC circuit, etc.) by using a flash controller within the control logic circuit 114 (e.g. a flash controller engine). The causes of the soft errors may comprise:

(A) Host command 1 second timeout, which may comprise:
(1) Timeout condition #1: DRAM or ARC DCCM variable error resulting in firmware halt;
(2) Timeout condition #2: occurrence of abnormal halt of the hardware system, the SATA controller engine, or the flash controller engine; and
(3) Timeout condition #3: ICCM code address mapping error, wherein the ICCM code address mapping error and ICCM code instruction (exception) error belong to the ICCM code error;

(B) ICCM code instruction (exception) error, such as the ICCM code instruction error, ICCM code instruction exception error, and/or ICCM code exception error; and (C) Uncorrectable ECC (UECC) error, such as the UECC error of the SRAM or the UECC error of the DRAM, which means the data stored in the SRAM or DRAM cannot be corrected by performing error correction according to the corresponding parity code(s) so as to generate the UECC error.

In Step S12, the memory controller 110 interrupts execution of the current procedure and activates an interruption service. When any soft error within various types of soft errors is detected, the microprocessor 112 records the execution address of the current procedure, interrupts any currently running procedure such as the current procedure, and jumps from the execute address thereof to the corresponding Interrupt Service Routine (ISR) to activate the interruption service. Note that one or more types of soft errors may correspond to a type of ISR. For example, an ISR (such as interrupt handler) may be invoked by an interrupt request from the hardware architecture, to transfer the interrupt request to the microprocessor 112, in order to interrupt the currently running procedure.

In Step S14, the memory controller 110 executes the error-handling program on the buffer memory 116. The memory controller 110 may jump from the execution address of the aforementioned current procedure to the beginning of the error-handling program to execute the error-handling program.

In Step S16, the memory controller 110 disables the transmission interface circuit 118 (more particularly, the SATA-PHY circuit), wherein the SATA controller and the SATA-PHY circuit are positioned in the transmission interface circuit 118. According to this embodiment, the memory controller 110 disables the transmission interface circuit 118 to stop any data reception and any data transmission regarding the host device 50, such as any reception/transmission of data, instruction and acknowledgement (ACK) message, to prevent the number of errors from increasing.

In Step S18, the memory controller 110 resets at least one hardware engine (e.g. one or more hardware engines) and the NV memory elements 122, such as flash memory elements (e.g. the flash chips or the flash dies). The memory controller 110 may reset aforementioned at least one hardware engine through resetting the ECC engine, the SATA controller engine, and/or the flash controller engine, and may reset the NV memory elements 122 as well. As a result, the hardware engine and the NV memory elements 122 may be restored to the normal state, and the memory controller 110 may prevent the problem that data cannot be recovered due to continuous erroneous operations of the hardware engine. Further, the aforementioned at least one hardware engine may comprise a hardware engine encountering soft error(s). For better comprehension, the memory controller 110 may determine the source/cause of the soft errors so as to deal with the issue. For example, if the cause of the soft errors is abnormal halt of the SATA controller engine, the memory controller 110 may merely reset the SATA controller engine to solve the issue.

Figure 5:
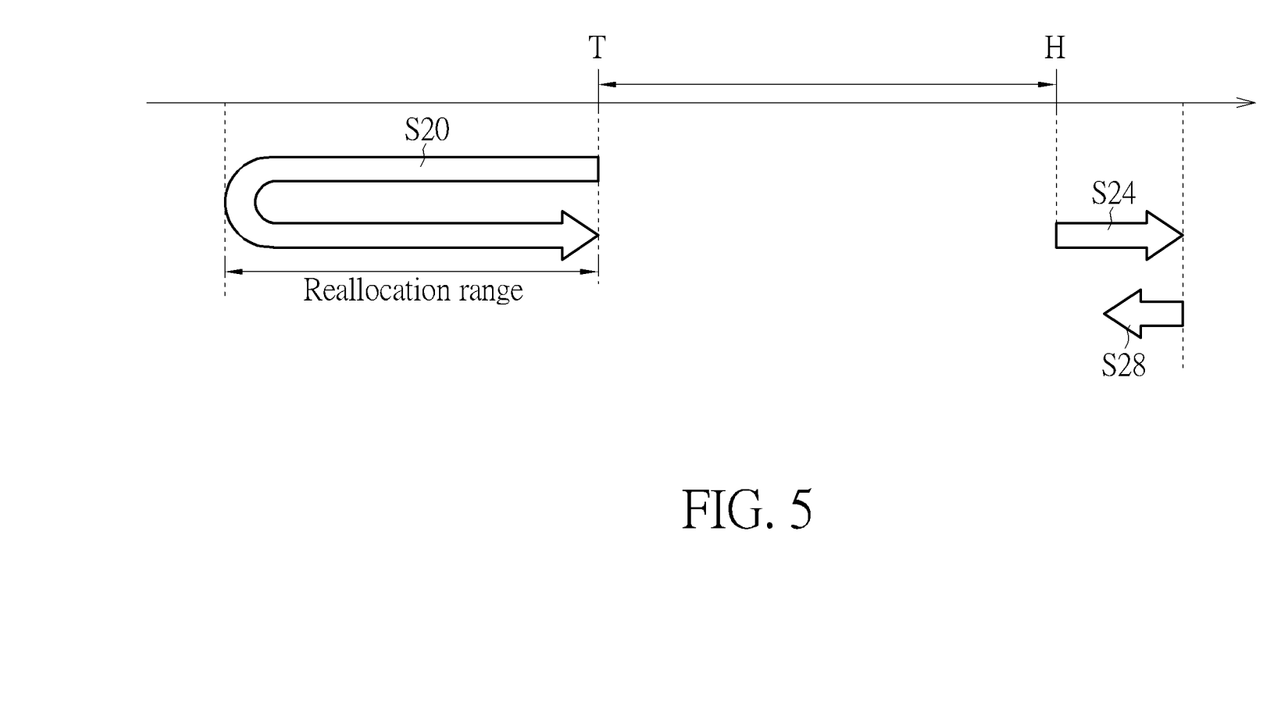
FIG. 5 illustrates the cache rearrangement in the error-handling method shown in FIG. 3 according to an embodiment of the present invention.

Next, the memory controller 110 may perform the cache rearrangement regarding a data cache (e.g. the volatile memory element 130 such as the DRAM) within the data storage device 100 as shown in FIG. 5, and may program the rearranged cache data into the NV memory elements 122, to perform data recovery, but the present invention is not limited thereto.

In Step S20, the memory controller 110 reallocates the cache data of the volatile memory element 130. Further, in order to prevent any loss of cache data, the memory controller 110 may reallocate the cache data of the volatile memory element 130 into the FIFO buffer, and prepare to write the cache data into the NV memory elements 122 such as the flash memory elements. To enhance the efficiency of Step S20, the memory controller 110 may take the address of the cache tail T as a reference to only reallocate cache data of one page in the volatile memory element 130, such as the 4 KB cache data on left of the cache tail T (i.e. the basic increment is equal to 1); or, in another example, the memory controller 110 may only reallocate the cache data of a super page in the volatile memory element 130, i.e. the basic increment is equal to 4 (e.g., the 16 KB cache data on the left of the cache tail T); or, in yet another example, the memory controller 110 may only reallocate the cache data of a super string in the volatile memory element 130 into the FIFO buffer, i.e. the basic increment is equal to 12 (e.g., the 48 KB cache data at the left of the cache tail T). Hence, no matter how large the size of the reallocated range (labeled "Reallocation range" beside the cache tail T in FIG. 5) in Step S20 is, the memory controller 110 may make the reallocated cache data such as the 4 KB, 16 KB or 48 KB cache data ready in the FIFO buffer, to prepare for writing the 4 KB, 16 KB or 48 KB cache data into the NV memory elements 122 such as the flash memory elements.

In Step S22, the memory controller 110 determines whether any triggered write command exists. If Yes, Step S24 is executed; and if No, Step S26 is executed. After the write command within the host commands is triggered, the volatile memory element 130 should allocate proper cache space to buffer the data from the host device 50. For example, the aforementioned triggered write command may represent at least one write command received from the host device 50. After the aforementioned at least one write command is triggered, the volatile memory element 130 is expected to allocate proper cache space to buffer the data from the host device 50, but did not perform this expected allocation operation due to some previous steps. In this situation, Step S24 is entered to ensure execution of this expected allocation operation.

In Step S24, the memory controller 110 allocates the cache space of the volatile memory element 130 according to the triggered write command, for example, starting from the original location of the cache head H. When a write command is triggered, the memory controller 110 moves the cache head H rightward, and make the right-move/shift amount of the cache head H conform to the number of triggered write commands or data amount thereof. For example, three sets of data corresponding to three triggered write commands may be 12 KB data to be written in total. In this situation, the microprocessor 112 may allocate 12 KB partial cache space on the volatile memory element 130, and move (or shift) the cache head H rightward by the basic increment (e.g. 1) for three times (e.g. (12 KB/4 KB)=3), to update the address of the cache head H. In another example, two sets of data corresponding to two triggered write commands may be 32 KB data to be written in total. In this situation, the microprocessor 112 may allocate 32 KB partial cache space on the volatile memory element 130, and move (or shift) the cache head H rightward by the basic increment (e.g. 4) twice (e.g. (32 KB/16 KB)=2), to update the address of the cache head H.

In Step S26, the memory controller 110 determines whether the data has been sent/buffered into the volatile memory element 130 such as the DRAM. If No (e.g. the data has not been sent/buffered into the volatile memory element 130 such as the DRAM), Step S28 is executed; and if Yes (e.g. the data has been sent/buffered into the volatile memory element 130 such as the DRAM), Step S30 is executed. As the SATA-PHY circuit has been disabled in Step S16, the data transmission of the SATA-PHY circuit has been terminated. In this situation, it is possible that the write command has been triggered but a portion of data of the write command has not been buffered into the volatile memory element 130. Therefore, the cache head H needs to be properly corrected, to make the cache head H point towards valid cache data.

In Step S28, the memory controller 110 resynchronizes the cache space of the volatile memory element 130, for example, by pulling the cache head H back to point towards the aforementioned valid cache data, such as the last set of buffered data. The memory controller 110 may be aware of the data transmission amount corresponding to the triggered write command according to the information fed back from the SATA-PHY circuit, and this data transmission amount is the data amount of the cache data. Afterwards, the memory controller 110 may further modify the move amount of the cache head H according to this data amount, and more particularly, may determine the modification amount (left-move/shift amount) of the cache head H in the resynchronizing operation according to this data amount. For example, the cache head H may have been moved (or shifted) rightward by the basic increment for 3 times, but the data amount of the cache data is merely 2, with the difference value being 1. Therefore, the memory controller 110 may move (or shift) the cache head H leftward by the basic increment once, i.e. by one basic increment.

In Step S30, the memory controller 110 programs the cache data (more particularly, the aforementioned rearranged cache data) into the NV memory elements 122, wherein the cache data is preferably programmed into at least one flushing block (e.g. one or more flushing blocks) within the NV memory elements 122 in the SLC mode. The flushing block is selected from idle blocks within the NV memory elements 122, and is mainly used for data writing in an emergency situation. The memory controller 110 selects the flushing block (which is similar to an active block), and programs the cache data into the flushing block with page, super page or super sting being the unit for programming. The memory controller 110 may program the cache data into the flushing block with a predetermined programming unit that is greater than one page. Under the situation where the predetermined programming unit (such as one super page or super string) is adopted to program the flushing block, when the remaining cache data after programming cannot be written into any super page or super string (e.g. the data length of the remaining cache data is less than that of the predetermined programming unit), the memory controller 110 may combine the remaining cache data with dummy data, to make the length of the combined data comprising the remaining cache data and the dummy data be equal to that of the predetermined programming unit such as one super page or super string, and may further program the combined data comprising the remaining cache data and the dummy data into a super page or super string of the flushing block. When the cache data is sequentially programmed into the flushing block, the address of the cache head H remains unchanged, and the address of the cache tail T is gradually moved (or shifted) rightward. After all cache data is programmed into the flushing block, the address of the cache head H will be equal to that of the cache tail T. When the execution of Step S30 is completed, all cache data will be stored into the NV memory elements 122.

In Step S40, the memory controller 110 may store an error log, and more particularly, may record associated information of a series of events starting from the occurrence of the soft errors into the error log, wherein the error log may be stored into the system block of the NV memory 120.

In Step S42, the memory controller 110 activates a watchdog module in the memory controller 110. For example, the watchdog module may be positioned in a watchdog circuit of the memory controller 110, and the watchdog circuit may comprise a watchdog timer, wherein the microprocessor 112 may activate the watchdog timer to perform soft reset; wherein the soft reset may comprise performing system reset in a software manner, for example, re-executing the system execution file (or in-system programming file), or clearing the value(s) of the system register(s), in order to achieve the purpose of system reset, but the present invention is not limited thereto.

In Step S44, the memory controller 110 activates the transmission interface circuit 118 and relinks with the host device 50. Since the transmission interface circuit 118 has been re-activated, the microprocessor 112 may relink and interact with the host device 50 through the transmission interface circuit 118. Through the operations of Step S42 and S44, the memory controller 110 (e.g. the microprocessor 112) may complete the soft reset to make the data storage device 100 operate normally again.

In view of the above, when error(s) occur in the operations of the data storage device 100, by executing the error-handling method of the present invention, the data storage device 100 is not only capable of preventing the situation of system halt, but also quickly storing the cache data into the NV memory 120 to prevent any loss of cache data. In addition, the memory controller 110 that operate according to the error-handling method of the present invention can make the data storage device 100 operate normally again, for example, by way of soft reset, to achieve the purposes of the present invention. Further, the error-handling method of the present invention may also store the error log which may be used as the basis of system debugging.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An error-handling method, the error-handling method being applicable to a data storage device, the data storage device comprising a non-volatile (NV) memory and a memory controller arranged to control the access of the NV memory, the NV memory comprising at least one NV memory element, the at least one NV memory element comprising a plurality of blocks, the error-handling method comprising:
    uploading, by utilizing the memory controller operating under control of a processing circuit within the memory controller, an error-handling program to a buffer memory equipped with error correction code (ECC) protection capability, wherein the buffer memory is positioned in the memory controller;
    in response to at least one error, interrupting, by utilizing the memory controller, execution of a current procedure and activating, by utilizing the memory controller, an interruption service;
    executing, by utilizing the memory controller, the error-handling program on the buffer memory;
    disabling, by utilizing the memory controller, a transmission interface circuit, wherein the transmission interface circuit is positioned in the memory controller, and is arranged to perform communications with a host device;
    resetting, by utilizing the memory controller, at least one hardware engine and the at least one NV memory element;
    performing, by utilizing the memory controller, cache rearrangement regarding a data cache within the data storage device, and programming, by utilizing the memory controller, rearranged cache data into the at least one NV memory element to perform data recovery; and
    through activating a watchdog module in the memory controller, activating the transmission interface circuit and relinking with the host device, completing, by utilizing the memory controller, soft reset to make the data storage device operate normally again.

2. The error-handling method of claim 1, wherein the step of interrupting execution of the current procedure and activating the interruption service further comprises:
    in response to occurrence of any soft error within multiple types of soft errors, interrupting execution of the current procedure and activating the interruption service, wherein the at least one error comprises said any soft error.

3. The error-handling method of claim 1, wherein the step of executing the error-handling program on the buffer memory further comprises:
    jumping from an execution address of the current procedure to beginning of the error-handling program to execute the error-handling program.

4. The error-handling method of claim 1, wherein the step of disabling the transmission interface circuit further comprises:
    disabling the transmission interface circuit to stop any data reception and any data transmission regarding the host device.

5. The error-handling method of claim 1, wherein the data storage device further comprises a dynamic random access memory (DRAM), and the data cache is positioned in the DRAM.

6. The error-handling method of claim 1, wherein the step of performing the cache rearrangement regarding the data cache within the data storage device further comprises:
    within a reallocation range, reallocating cache data of the data cache, wherein the reallocation range is beside a cache tail of the data cache.

7. The error-handling method of claim 6, wherein the step of performing the cache rearrangement regarding the data cache within the data storage device further comprises:
  determining whether at least one triggered write command exists; and
  in response to existence of the at least one triggered write command, allocating cache space of the data cache according to the triggered write command.

8. The error-handling method of claim 6, wherein the step of performing the cache rearrangement regarding the data cache within the data storage device further comprises:
  determining whether there is data of any triggered write command that has not been buffered into the data cache; and
  in response to there being the data of said any triggered write command that has not been buffered into the data cache, resynchronizing cache space of the data cache.

9. The error-handling method of claim 1, wherein the step of programming the rearranged cache data to the at least one NV memory element further comprises:
  programming the rearranged cache data to at least one flushing block in the at least one NV memory element, wherein the at least one flushing block is selected from idle blocks in the at least one NV memory element.

10. The error-handling method of claim 9, wherein the step of programming the rearranged cache data to the at least one flushing block in the at least one NV memory element further comprises:
  programming the rearranged cache data to the at least one flushing block with a predetermined programming unit that is greater than one page; and
  in response to a data length of remaining cache data after programming being less than that of the predetermined programming unit, combining the remaining cache data with dummy data to make a data length of combined data comprising the remaining cache data and the dummy data be equal to that of the predetermined programming unit, and program the combined data comprising the remaining cache data and the dummy data to the at least one flushing block.

11. A data storage device, comprising:
  a non-volatile (NV) memory, arranged to store information, wherein the NV memory comprises at least one NV memory element, and the at least one NV memory element comprises a plurality of blocks; and
  a controller, coupled to the NV memory, arranged to control operations of the data storage device, wherein the controller comprises:
    a buffer memory, arranged to temporarily store information;
    a transmission interface circuit conforming to a specific communications specification, the transmission interface circuit arranged to perform communications according to the specific communications specification; and
    a processing circuit, arranged to control the controller according to a plurality of host commands from a host device, to allow the host device to access the NV memory through the controller, wherein:
      the controller uploads an error-handling program to the buffer memory equipped with error correction code (ECC) protection capability;
      in response to at least one error, the controller interrupts execution of a current procedure and activates an interruption service;
      the controller executes the error-handling program on the buffer memory;
      the controller disables the transmission interface circuit, wherein the transmission interface circuit is arranged to perform communications with the host device;
      the controller resets at least one hardware engine and the at least one NV memory element;
      the controller performs cache rearrangement regarding a data cache within the data storage device, and programs rearranged cache data into the at least one NV memory element, to perform data recovery; and
      through activating a watchdog module in the controller, activating the transmission interface circuit, and relinking with the host device, the controller completes soft reset to make the data storage device operate normally again.

12. The data storage device of claim 11, wherein in response to occurrence of any soft error within multiple types of soft errors, the controller interrupts execution of the current procedure and activates the interruption service, wherein the at least one error comprises said any soft error.

13. The data storage device of claim 11, wherein the controller jumps from an execution address of the current procedure to beginning of the error-handling program to execute the error-handling program.

14. The data storage device of claim 11, wherein the controller disables the transmission interface circuit to stop any data reception and any data transmission regarding the host device.

15. The data storage device of claim 11, wherein the data storage device further comprises a dynamic random access memory (DRAM), and the data cache is positioned in the DRAM.

16. A controller of a data storage device that comprises the controller and a non-volatile (NV) memory, the NV memory comprising at least one NV memory element, and the at least one NV memory element comprising a plurality of blocks, wherein the controller comprises:
  a buffer memory, arranged to temporarily store information;
  a transmission interface circuit conforming to a specific communications specification, wherein the transmission interface circuit performs communications according to the specific communications specification; and
  a processing circuit, arranged to control the controller according to a plurality of host commands from a host device, to allow the host device to access the NV memory through the controller, wherein:
    the controller uploads an error-handling program to the buffer memory equipped with error correction code (ECC) protection capability;
    in response to at least one error, the controller interrupts execution of a current procedure and activates an interruption service;
    the controller executes the error-handling program on the buffer memory;
    the controller disables the transmission interface circuit, wherein the transmission interface circuit is arranged to perform communications with the host device;
    the controller resets at least one hardware engine and the at least one NV memory element;
    the controller performs cache rearrangement regarding a data cache within the data storage device, and programs rearranged cache data into the at least one NV memory element, to perform data recovery; and through activating a watchdog module in the controller, activating the transmission interface circuit and relinking with the host device, the controller completes soft reset to make the data storage device operate normally again.

17. The controller of claim 16, wherein in response to occurrence of any soft error within multiple types of soft errors, the controller interrupts execution of the current procedure and activates the interruption service, wherein the at least one error comprises said any soft error.

18. The controller of claim 16, wherein the controller jumps from an execution address of the current procedure to beginning of the error-handling program to execute the error-handling program.

19. The controller of claim 16, wherein the controller disables the transmission interface circuit to stop any data reception and any data transmission regarding the host device.

20. The controller of claim 16, wherein the data storage device further comprises a dynamic random access memory (DRAM), and the data cache is positioned in the DRAM.

* * * * *